United States Patent
Wang et al.

(10) Patent No.: US 10,509,942 B2
(45) Date of Patent: Dec. 17, 2019

(54) FINGERPRINT IDENTIFICATION DEVICE, FINGERPRINT IDENTIFICATION METHOD AND TOUCH SCREEN

(71) Applicant: BOE TECHNOLOGY GROUP CO., LTD., Beijing (CN)

(72) Inventors: Haisheng Wang, Beijing (CN); Lijun Zhao, Beijing (CN); Yingming Liu, Beijing (CN); Rui Xu, Beijing (CN); Changfeng Li, Beijing (CN); Yanan Jia, Beijing (CN); Yuzhen Guo, Beijing (CN); Pinchao Gu, Beijing (CN); Yunke Qin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 25 days.

(21) Appl. No.: 15/756,168

(22) PCT Filed: Sep. 5, 2017

(86) PCT No.: PCT/CN2017/100467
§ 371 (c)(1),
(2) Date: Feb. 28, 2018

(87) PCT Pub. No.: WO2018/145450
PCT Pub. Date: Aug. 16, 2018

(65) Prior Publication Data
US 2019/0026522 A1  Jan. 24, 2019

(30) Foreign Application Priority Data

Feb. 10, 2017  (CN) .......................... 2017 1 0073843

(51) Int. Cl.
*G06K 9/00* (2006.01)
*G02F 1/1335* (2006.01)
*G06F 3/041* (2006.01)

(52) U.S. Cl.
CPC ..... *G06K 9/0004* (2013.01); *G02F 1/133514* (2013.01); *G02F 1/133526* (2013.01); *G06F 3/0412* (2013.01)

(58) Field of Classification Search
CPC ............. G06K 9/0004; G06K 9/00046; G06F 3/0412; G02F 1/133526; G02F 1/133514
See application file for complete search history.

(56) References Cited

U.S. PATENT DOCUMENTS

| 9,292,135 B2 | 3/2016 | Kuba | |
|---|---|---|---|
| 2010/0092047 A1* | 4/2010 | Yamamoto | A61B 5/117 382/124 |

(Continued)

FOREIGN PATENT DOCUMENTS

| CN | 102243402 A | 11/2011 |
|---|---|---|
| CN | 102681731 A | 9/2012 |

(Continued)

OTHER PUBLICATIONS

International search report dated Nov. 28, 2017 for corresponding application PCT/CN2017/100467 with English translation attached.

(Continued)

*Primary Examiner* — Qian Yang
(74) *Attorney, Agent, or Firm* — Nath, Goldberg & Meyer; Joshua B. Goldberg

(57) ABSTRACT

The present disclosure discloses a fingerprint identification device, a fingerprint identification method and a touch screen. The fingerprint identification device comprises: an optical sensor with a receiving surface configured to receive fingerprint reflected light; and a lens assembly configured to converge the fingerprint reflected light toward the receiving surface of the optical sensor, wherein the lens assembly includes a liquid crystal lens configured to converge the fingerprint reflected light toward the receiving surface of the (Continued)

optical sensor by rotating liquid crystal molecules at different angles upon energization.

9 Claims, 3 Drawing Sheets

(56) References Cited

U.S. PATENT DOCUMENTS

| | | | |
|---|---|---|---|
| 2012/0182264 A1 | 7/2012 | Lee et al. | |
| 2016/0334934 A1* | 11/2016 | Mo | G02F 1/13338 |
| 2017/0117329 A1* | 4/2017 | Maruyama | H01L 27/14636 |
| 2018/0046281 A1* | 2/2018 | Pi | A61B 5/02416 |
| 2018/0211989 A1* | 7/2018 | Hogyoku | H01L 27/14 |

FOREIGN PATENT DOCUMENTS

| | | |
|---|---|---|
| CN | 104035626 A | 9/2014 |
| CN | 104281334 A | 1/2015 |
| CN | 105590083 A | 5/2016 |
| CN | 106298859 A | 1/2017 |
| CN | 106845436 A | 6/2017 |

OTHER PUBLICATIONS

First Office Action dated Mar. 22, 2019, for corresponding Chinese application No. 201710073843.8 with English translation.

* cited by examiner

FINGERPRINT IDENTIFICATION DEVICE, FINGERPRINT IDENTIFICATION METHOD AND TOUCH SCREEN

CROSS-REFERENCE TO RELATED APPLICATION

This is a National Phase application filed under 35 U.S.C. 371 as a national stage of PCT/CN2017/100467, filed on Sep. 5, 2017, an application claiming the priority of Chinese Patent Application No. 201710073843.8 submitted to the Chinese Intellectual Property Office on Feb. 10, 2017, the disclosure of which is incorporated herein in its entirety by reference.

TECHNICAL FIELD

The present disclosure relates to the technical field of touch control, and particularly relates to a fingerprint identification device, a fingerprint identification method and a touch screen.

BACKGROUND OF THE INVENTION

Portable terminals are widely applied in people's daily life with more and more powerful functions which greatly facilitates the user. However, while providing greater convenience for the user, portable terminals also store a great deal of private information. Once the portable terminal is lost or stolen, such private information may be easily leaked out due to a lack of related protection, causing inconvenience for the user. Thus, it is very necessary to provide some confidential settings on the portable terminal.

It is well known that fingerprint identification technology has become one of the most secure biometric identification technologies because of the uniqueness of fingerprint. Accordingly, more and more portable terminals with a touch screen guarantee confidentiality through fingerprint identification. Current fingerprint identification devices are typically disposed in a non-visible area of the display panel. For instance, the fingerprint identification device for a cellphone is typically disposed on the home button or at back of the cellphone, which cannot realize fingerprint identification within the visible area.

SUMMARY

The present disclosure has been accomplished in order to at least partially solve the problems in the prior art. The present disclosure provides a fingerprint identification device, a fingerprint identification method and a touch screen capable of fingerprint identification within a visible area and improving accuracy of fingerprint identification.

According to one aspect of the disclosure, there is provided a fingerprint identification device comprising:

an optical sensor with a receiving surface configured to receive fingerprint reflected light; and a lens assembly configured to converge the fingerprint reflected light toward the receiving surface of the optical sensor, wherein the lens assembly includes a liquid crystal lens configured to converge the fingerprint reflected light toward the receiving surface of the optical sensor by rotating liquid crystal molecules at different angles upon energization.

The liquid crystal lens may comprises:

two substrates disposed opposite to each other;

two alignment films respectively disposed on two surfaces of the two substrates facing each other with a gap therebetween; and a liquid crystal layer received in the gap.

One of the two alignment films may be provided with an opening at a central area.

The lens assembly may further comprise a micro lens provided on the receiving surface of the optical sensor and below the liquid crystal lens, and configured to change a direction of light inclined to the receiving surface in the fingerprint reflected light into tending to be perpendicular to the receiving surface.

According to another aspect of the disclosure, there is provided a touch screen comprising:

a display panel; and the fingerprint identification device as mentioned above, which is integrated into the display panel and within a visible area of the display panel.

The display panel may include an array substrate and a color filter substrate in an arrangement to be aligned and assembled; and the optical sensor is disposed in the array substrate, and the liquid crystal lens is disposed on the color filter substrate above the array substrate.

The lens assembly may further comprise a micro lens provided on the receiving surface of the optical sensor and below the liquid crystal lens, and configured to change a direction of light inclined to the receiving surface in the fingerprint reflected light into tending to be perpendicular to the receiving surface.

The number of the optical sensors may be two or more and the optical sensors are distributed in an array; and the number of the micro lenses is consistent with the number of the optical sensors, and the micro lenses are arranged on the receiving surfaces of the optical sensors in a one-to-one correspondence.

According to still another aspect of the disclosure, there is provided a fingerprint identification method using the above mentioned fingerprint identification device for fingerprint identification, the fingerprint identification method comprising:

step S1: energizing a liquid crystal lens to rotate liquid crystal molecules therein at different angles;

step S2: converging, by the liquid crystal lens, fingerprint reflected light toward a receiving surface of an optical sensor; and step S3: receiving, by the optical sensor, the fingerprint reflected light.

The step S2 may include: changing, by a micro lens, a direction of light inclined to the receiving surface in the fingerprint reflected light into tending to be perpendicular to the receiving surface.

DETAILED DESCRIPTION

To improve understanding of the technical solution of the present disclosure for those skilled in the art, the fingerprint identification device, the fingerprint identification method and the touch screen provided in the disclosure will be described below in detail in conjunction with the accompanying drawings.

First Exemplary Embodiment

Figure 1:
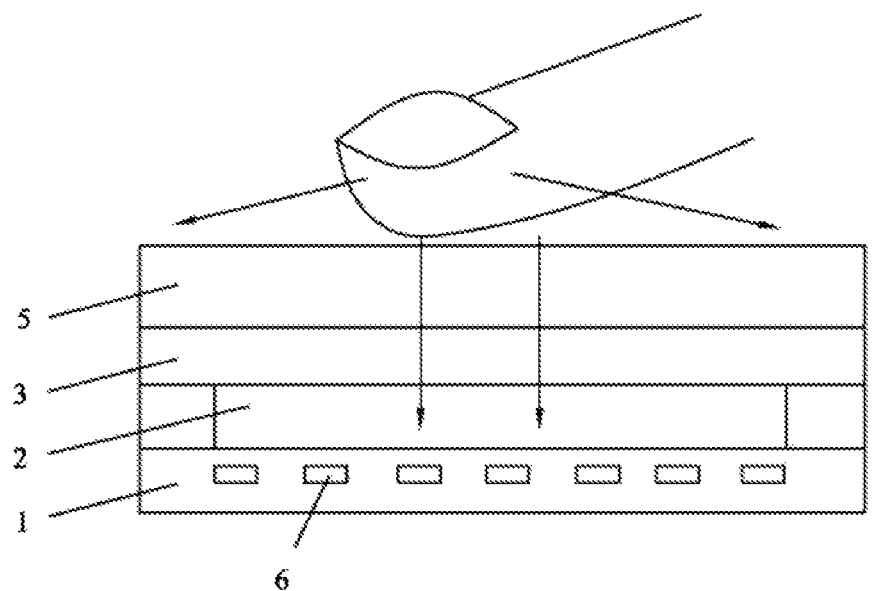
FIG. 1 is a schematic view showing a case where an optical sensor is integrated into an array substrate of an existing display panel.

In existing technology, as shown in FIG. 1, when an optical sensor 6 is integrated into an array substrate 1, a distance to the contact surface of the finger is relatively larger, resulting in part of the light reflected by the finger cannot reach the optical sensor 6 due to scattering, thereby causing the optical sensor 6 to form a blurred fingerprint pattern as a result of insufficient received light and thus affecting the accuracy of fingerprint identification.

According to one aspect of the disclosure, as shown in FIGS. 2-6, this exemplary embodiment provides a fingerprint identification device which is integrated into an array substrate 1 of a touch screen and located within a visible area of the touch screen. The fingerprint identification device includes an optical sensor 6 and a lens assembly, wherein the number of the optical sensors 6 is two or more and the optical sensors 6 are distributed in the array substrate 1 in an array, so as to receive fingerprint reflected light and convert the received fingerprint reflected light into an electrical signal to be transmitted to a controller. The controller forms an optical fingerprint pattern according to the electrical signal to conduct identification. The fingerprint reflected light refers to light emitted from the display panel to illuminate a finger and be reflected by the finger when the finger touches a protective layer 5 of the display panel of the touch screen. Each of the optical sensors 6 includes a receiving surface 61 for receiving the fingerprint reflected light.

Figure 5A:
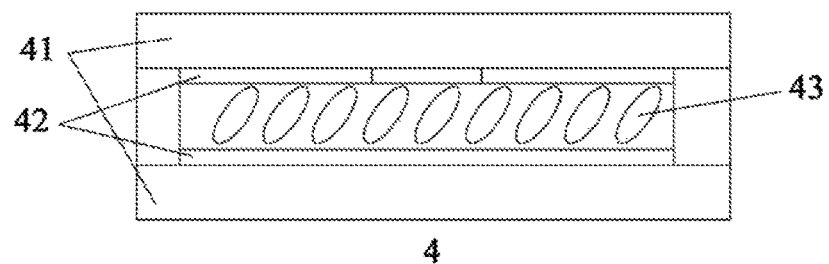
FIG. 5A is a structural schematic view showing a liquid crystal lens not energized according to an exemplary embodiment of the disclosure.
Figure 5B:
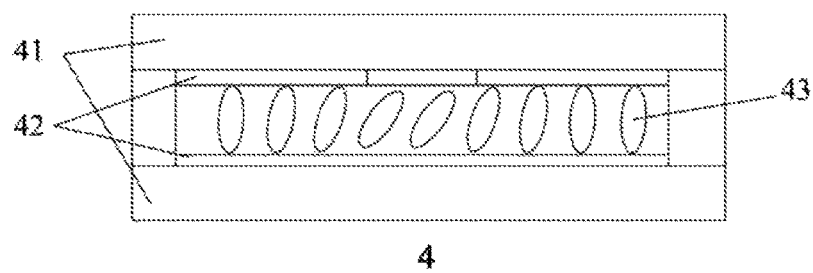
FIG. 5B is a structural schematic view showing the energized liquid crystal lens according to an exemplary embodiment of the disclosure.
Figure 6:
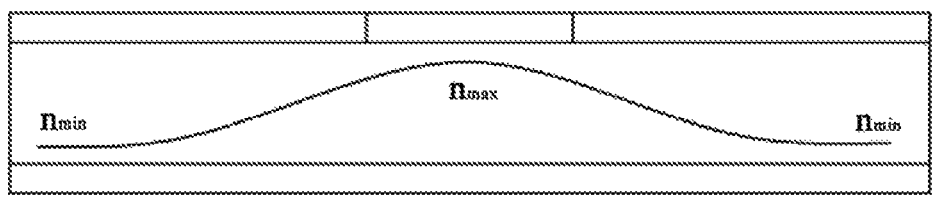
FIG. 6 is a refractive index profile of the energized liquid crystal lens according to an exemplary embodiment of the disclosure.

A lens assembly is configured to converge the fingerprint reflected light toward the receiving surface 61 of the optical sensor 6. In this exemplary embodiment, the lens assembly includes a micro lens 7 and a liquid crystal lens 4, the liquid crystal lens 4 is disposed on a color filter substrate 3 and below the protective layer 5, so as to converge the fingerprint reflected light toward the receiving surface 61 of the optical sensor 6. In this exemplary embodiment, as shown in FIGS. 5A and 5B, the liquid crystal lens 4 includes: two substrates 41 disposed opposite to each other; two alignment films 42 respectively disposed on two surfaces of the two substrates 41 facing each other with a gap therebetween; and a liquid crystal layer 43 received in the gap. An alignment film 42 adjacent to an upper substrate 41 has an opening at a central position of the alignment film 42. When the liquid crystal lens 4 is not energized, liquid crystals within the liquid crystal layer 43 are prevented from rotating and present a state as shown in FIG. 5A. At this time, the display panel displays normally. When a fingerprint identification is required, the liquid crystal lens 4 is energized, which then causes the liquid crystals to rotate. However, due to the opening in the alignment film 42, liquid crystal molecules at different positions are subjected to different electric fields, thus rotating at different angles. At this time, the liquid crystal layer 43 presents a state as shown in FIG. 5B. In such case, liquid crystals at different positions of the liquid crystal lens 4 have different refractive indices. As shown in FIG. 6, an area corresponding to the opening has a maximum refractive index, and the refractive index becomes smaller as distancing from the opening so that the liquid crystal lens 4 can have a function similar to a convex lens, namely, converging the fingerprint reflected light toward the receiving surface 61 of the optical sensor 6.

Figure 3:
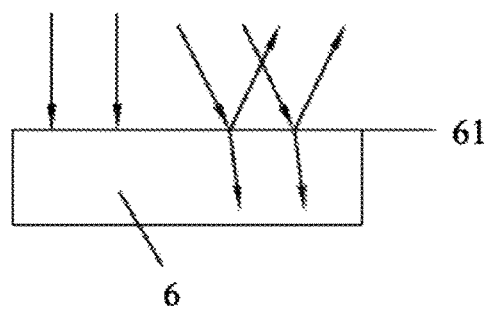
FIG. 3 is a schematic view showing light paths when the optical sensor without a micro lens receives light at different angles.
Figure 4:
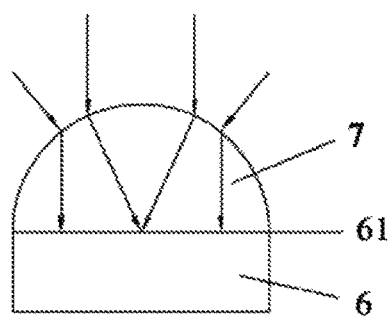
FIG. 4 is a schematic view showing light paths when the optical sensor with a micro lens receives light at different angles according to an exemplary embodiment of the disclosure.

In this exemplary embodiment, the number of the micro lenses 7 is consistent with the number of the optical sensors 6, and the micro lenses 7 are arranged on the receiving surfaces 61 of the optical sensors 6 in a one-to-one correspondence and disposed below the liquid crystal lens 4. The micro lens 7 is configured to change a direction of light inclined to the receiving surface 61 in the fingerprint reflected light into tending to be perpendicular to the receiving surface 61. As shown in FIG. 3, without a micro lens, when the inclined fingerprint reflected light reaches the receiving surface 61 of the optical sensor 6, part of light is reflected and refracted due to the problem with the refractive index of the surface film medium, resulting in a lower light conversion efficiency while affecting uniformity of the light intensity received by the receiving surface 61, thus causing a decrease in the uniformity of light conversion efficiency. In order to solve the above problem, as shown in FIG. 4, the receiving surface 61 of the optical sensor 6 in this exemplary embodiment is provided with a micro lens 7. In this way, a light path of the inclined fingerprint reflected light is optimized so that the light can be illuminated onto the receiving surface 61 as perpendicularly as possible. Thus, the amount of reflected and refracted light is reduced, the light conversion efficiency and its uniformity are improved, and thereby the accuracy of fingerprint identification is increased.

It should be noted that although the lens assembly in this exemplary embodiment includes a micro lens 7 and a liquid crystal lens 4, this disclosure is not limited thereto. In practical applications, the lens assembly may be provided with only a micro lens 7 or liquid crystal lens 4, which can also have a function of converging the fingerprint reflected light toward the receiving surface of the optical sensor 6.

The fingerprint identification device disclosed in this disclosure may improve the accuracy of fingerprint identification in use with a lens assembly. Thus, when integrated into a touch screen and disposed within a visible area of thereof, the fingerprint identification device according to the disclosure can obtain a clear optical fingerprint pattern to realize fingerprint identification even if the optical sensor 6 is integrated into the array substrate 1 and has a greater distance to the contact surface of the finger. Obviously, in practical applications, the fingerprint identification device may be disposed in any electrical device having a touch screen, which is not particularly limited hereby in the disclosure.

In conclusion, the fingerprint identification device according to the exemplary embodiment of the disclosure increases an amount of light reaching the receiving surface of the optical sensor by using a lens assembly to converge the fingerprint reflected light toward the receiving surface of the optical sensor, thus improving clarity of the formed optical fingerprint pattern and increasing the accuracy of fingerprint identification. The required accuracy of fingerprint identification can still be achieved even if the fingerprint identification device according to the disclosure is disposed in a display area of the touch screen.

Second Exemplary Embodiment

According to another aspect of the disclosure, an exemplary embodiment of the disclosure provides a touch screen including a display panel and the fingerprint identification device according to the first exemplary embodiment of the disclosure, wherein the fingerprint identification device is integrated into the display panel and within a visible area of the display panel.

Figure 2:
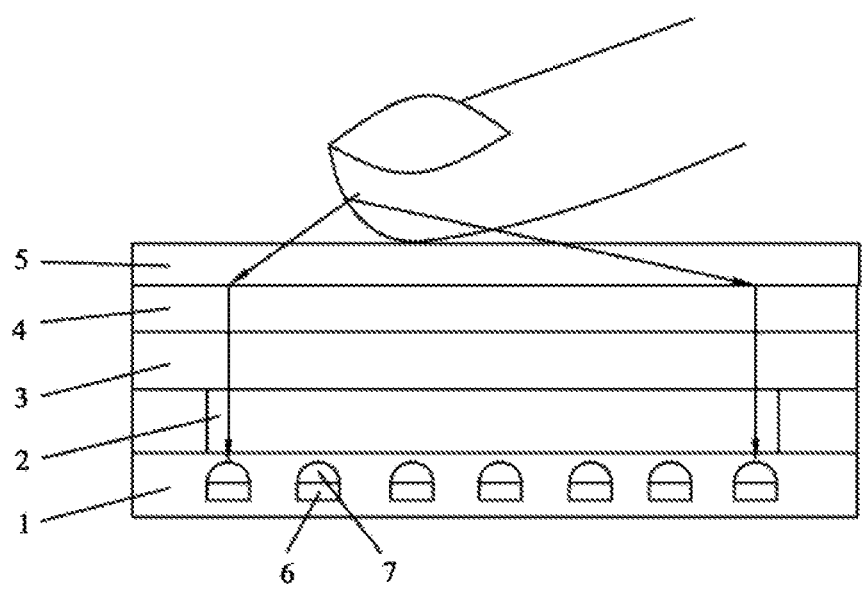
FIG. 2 is a structural schematic view showing a fingerprint identification device integrated into a display panel according to an exemplary embodiment of the disclosure.

In this exemplary embodiment, as shown in FIG. 2, the touch screen includes an array substrate 1 and a color filter substrate 3 in an arrangement to be aligned and assembled, as well as a liquid crystal layer 2 disposed between the array substrate 1 and the color filter substrate 3. The optical sensor 6 is disposed within the array substrate 1. The lens assembly includes a micro lens 7 and a liquid crystal lens 4, wherein the liquid crystal lens 4 is disposed on the color filter substrate 3, so as to, when energized, converge the fingerprint reflected light toward the receiving surface 61 of the optical sensor 6; the micro lens 7 is disposed on the receiving surface of the optical sensor 6 and configured to change a direction of light inclined to the receiving surface 61 in the fingerprint reflected light into tending to be perpendicular to the receiving surface 61. The micro lens 7 and liquid crystal lens 4 are not repeated here since they have been described in detail in the first exemplary embodiment.

In this exemplary embodiment, the number of the optical sensors 6 is two or more and the optical sensors 6 are distributed in the array substrate 1 in an array, the number of the micro lenses 7 is consistent with the number of the optical sensors 6, and the micro lenses 7 are arranged on the receiving surfaces 61 of the optical sensors 6 in a one-to-one correspondence. However, the disclosure is not limited thereto. In practical applications, the optical sensor 6 may also adopt any other distributions, and the micro lenses 7 are arranged on the receiving surfaces 61 of the optical sensors 6 in a one-to-one correspondence.

By using the fingerprint identification device according to the first exemplary embodiment of the disclosure, the touch screen according to this exemplary embodiment of the disclosure can integrate the fingerprint identification device into the display panel and within a visible area of the display panel while guaranteeing the accuracy of fingerprint identification, thus solving the current problem that a fingerprint identification device can only be disposed in a non-visible area such as the home button or back of the cellphone, or that a fingerprint identification device can be disposed in a visible area but the accuracy of fingerprint identification is limited.

Third Exemplary Embodiment

According to still another aspect of the disclosure, the exemplary embodiment of the disclosure discloses a fingerprint identification method using the fingerprint identification device according to the first exemplary embodiment of the disclosure for fingerprint identification, the fingerprint identification method comprising:

step S1: energizing a liquid crystal lens 4 to rotate liquid crystal molecules therein at different angles;

step S2: converging, by the liquid crystal lens 4, fingerprint reflected light toward a receiving surface 61 of an optical sensor 6; and step S3: receiving, by the optical sensor 6, the fingerprint reflected light.

In this exemplary embodiment, the step S2 may further include: changing, by a micro lens 7, a direction of light inclined to the receiving surface 61 in the fingerprint reflected light into tending to be perpendicular to the receiving surface 61.

Specific structures and functions of the micro lens 7 and liquid crystal lens 4 are not repeated here since they have been described in detail in the first exemplary embodiment.

The fingerprint identification method according to this exemplary embodiment of the disclosure increases an amount of light reaching the receiving surface of the optical sensor by converging the fingerprint reflected light toward the receiving surface of the optical sensor, thus improving clarity of the formed optical fingerprint pattern and increasing the accuracy of fingerprint identification. The required accuracy of fingerprint identification can still be achieved even if the fingerprint identification device according to the disclosure is disposed within a display area of the touch screen.

It should be understood that the above embodiments are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:

1. A fingerprint identification device comprising:
an optical sensor with a receiving surface configured to receive fingerprint reflected light; and
a lens assembly configured to converge the fingerprint reflected light toward the receiving surface of the optical sensor,
wherein the lens assembly comprises a liquid crystal lens configured to converge the fingerprint reflected light toward the receiving surface of the optical sensor, and
wherein the lens assembly further comprises a micro lens provided on the receiving surface of the optical sensor and below the liquid crystal lens, and configured to change a direction of light inclined to the receiving surface in the fingerprint reflected light to be perpendicular to the receiving surface.

2. The fingerprint identification device according to claim 1,
wherein the liquid crystal lens comprises:
two substrates disposed opposite to each other;
two alignment films respectively disposed on two surfaces of the two substrates facing each other with a gap therebetween; and
a liquid crystal layer received in the gap.

3. The fingerprint identification device according to claim 2,
wherein one of the two alignment films is provided with an opening.

4. A touch screen comprising:
a display panel; and
the fingerprint identification device according to claim 1, which is integrated into the display panel and disposed within a visible area of the display panel.

5. The touch screen according to claim 4,
wherein the display panel comprises an array substrate and a color filter substrate in an arrangement to be aligned and assembled; and the optical sensor is disposed in the array substrate, and the liquid crystal lens is disposed on the color filter substrate above the array substrate.

6. The touch screen according to claim 4, wherein the lens assembly further comprises a micro lens provided on the receiving surface of the optical sensor and below the liquid crystal lens, and configured to change a direction of light inclined to the receiving surface in the fingerprint reflected light into tending to be perpendicular to the receiving surface.

7. The touch screen according to claim 6, wherein the number of the optical sensors is two or more and the optical sensors are distributed in an array; and the number of the micro lenses is consistent with the number of the optical sensors, and the micro lenses are arranged on the receiving surfaces of the optical sensors in a one-to-one correspondence.

8. A fingerprint identification method using the fingerprint identification device according claim 1 for fingerprint identification, the fingerprint identification method comprising:
step S1: energizing a liquid crystal lens to rotate liquid crystal molecules therein at different angles;
step S2: converging, by the liquid crystal lens, fingerprint reflected light toward a receiving surface of an optical sensor; and
step S3: receiving, by the optical sensor, the fingerprint reflected light.

9. The fingerprint identification method according to claim 8, wherein the step S2 comprises: changing, by a micro lens, a direction of light inclined to the receiving surface in the fingerprint reflected light into tending to be perpendicular to the receiving surface.

* * * * *